United States Patent [19]
Lindsey

[11] Patent Number: 6,125,520
[45] Date of Patent: Oct. 3, 2000

[54] SHAKE AND BREAK PROCESS FOR SHEET METAL

[75] Inventor: Timothy W. Lindsey, Blue Mountain, Miss.

[73] Assignee: Thyssen Elevator Holding Corporation, Troy, Mich.

[21] Appl. No.: 09/294,938

[22] Filed: Apr. 19, 1999

[51] Int. Cl.⁷ ...................................................... B23P 17/00
[52] U.S. Cl. ........................... 29/413; 29/412; 29/414; 29/426.4; 83/917
[58] Field of Search .............................. 29/412, 413, 414, 29/426.4; 83/914, 917

[56] References Cited

U.S. PATENT DOCUMENTS

| | | | |
|---|---|---|---|
| 2,421,323 | 5/1947 | Fruengel | 29/413 |
| 4,008,599 | 2/1977 | Dohmann | 72/354 |
| 4,391,123 | 7/1983 | Salvagnini | 72/464 |
| 4,677,720 | 7/1987 | Alling et al. | 29/148.4 C |
| 4,981,058 | 1/1991 | Gavrun, III | 83/34 |
| 5,035,163 | 7/1991 | Bakermans | 83/86 |
| 5,046,637 | 9/1991 | Kysh | 220/610 |
| 5,195,412 | 3/1993 | Flemming et al. | 83/37 |
| 5,235,881 | 8/1993 | Sano et al. | 83/55 |
| 5,377,519 | 1/1995 | Hayashi | 72/326 |
| 5,616,112 | 4/1997 | Seto et al. | 483/29 |
| 5,685,812 | 11/1997 | Seto et al. | 483/29 |
| 5,689,986 | 11/1997 | Jacobs, Jr. | 72/7.4 |
| 5,740,713 | 4/1998 | Korb | 83/582 |
| 5,819,573 | 10/1998 | Seaman | 72/60 |
| 5,878,619 | 3/1999 | Walczak | 72/478 |
| 5,937,518 | 8/1999 | Steiner | 29/890.03 |

*Primary Examiner*—David P. Bryant
*Assistant Examiner*—Essama Omgba
*Attorney, Agent, or Firm*—White & Case LLP

[57] ABSTRACT

In a process and apparatus for forming parts from a sheet of metal stock material so that they can be separated by a shake-and-break operation, elongated holes are punched in the sheet to separate the first part from the second part except at at least one shake-and-break location. At the shake-and-break location, a frusto-conical shape punch and die punch an opening on either side of a center tab connecting the parts. The wider ends of the frusto-conical shape holes face the tab, and the narrower ends adjoin the elongated holes and have the same width as such holes. In such a manner, the points where ends of the tab connect to the first and second parts are located in recesses located to the outside of the edges of the elongated holes. When the pieces are subsequently separated in a shake and break process, any residual burrs from where the tabs separate from the parts are located in the recesses, rather than along the edges of the part, and do not need to be removed.

3 Claims, 2 Drawing Sheets

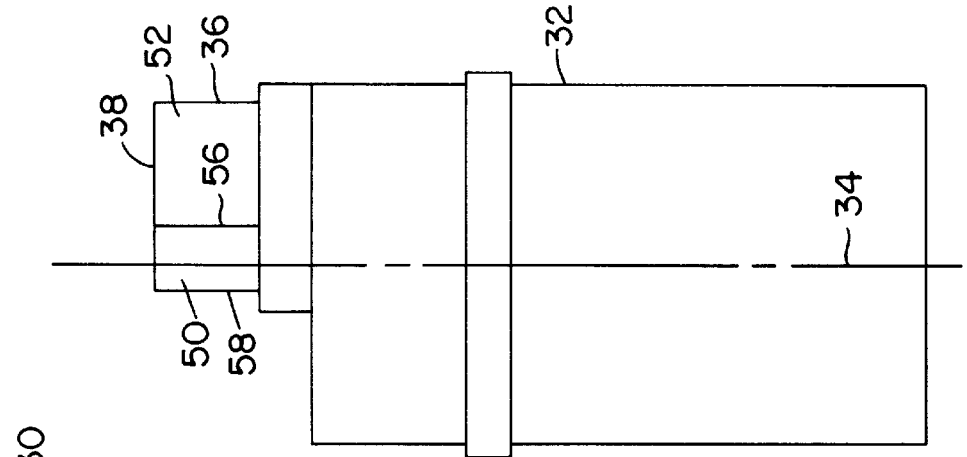
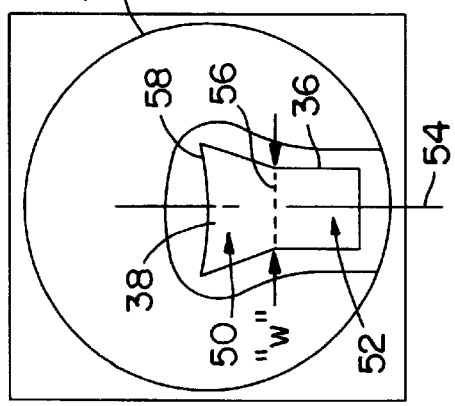
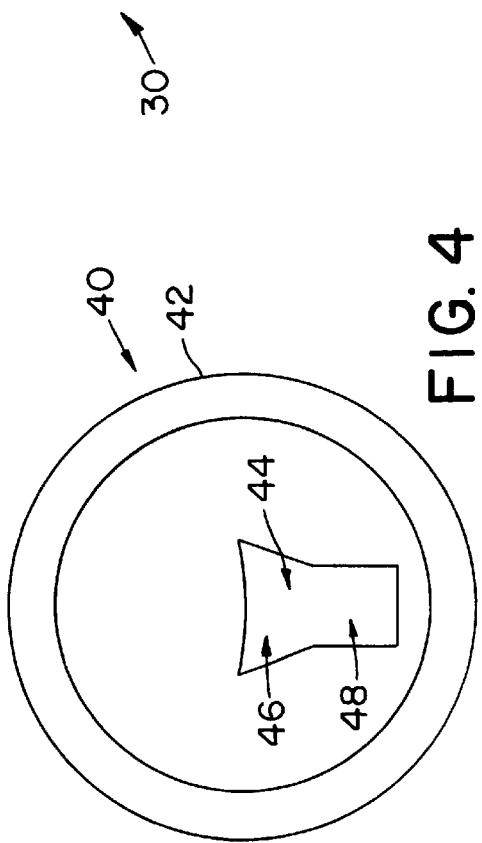
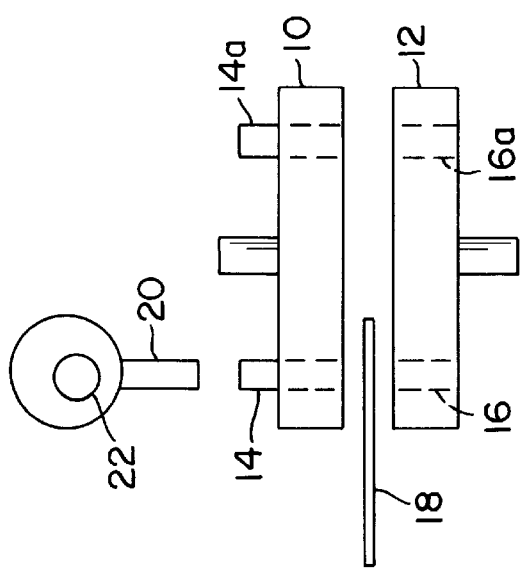

SHAKE AND BREAK PROCESS FOR SHEET METAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a tool, preferably a punch and die set, for use in a shake-and-break process.

A known apparatus used to form shaped parts out of flat metal stock is a turret press, an example of which is disclosed in U.S. Pat. No. 5,685,812. In its simplest form, referring to FIG. 1, a turret press includes an upper rotatable turret 10 and a lower rotatable turret 12, both turrets being in the shape of a disk. The upper rotatable turret 10 includes a number of openings for mounting a plurality of interchangeable punches 14, 14a, two of which are shown for purposes of illustration. The lower rotatable turret 12 includes openings for receiving cooperating dies 16, 16a.

A sheet of metal stock 18 (or alternatively a plurality of nested sheets) is supported horizontally on a table (not shown) which is moveable in any direction in the horizontal plane so as to selectively reposition the sheet 18 relative to the press. A ram 20 is positioned over one of the punches 14 and is mounted on a crankshaft 22 for movement in the vertical direction.

In order to form a shaped part, the turrets 10 and 12 are rotated to move a selected punch and die set 14, 16 under the ram 20. The stock piece 18 is maneuvered so that the material to be removed is located between the punch 14 and die 16, and the ram is actuated to punch a hole in the stock piece 18 corresponding to the shape of the punch face. The sheet 18 is then repositioned for the next punch operation. If a different punch and die set are to be used, i.e., to punch a different shape hole, the turrets 10 and 12 are rotated to position the new punch and die set, e.g., 14a, 16a, below the ram 20. This process is repeated until the part is formed.

In order to save material and labor, several parts are punched in patterns from each sheet of stock material. In a typical operation, a long, rectangular shaped punch is used to cut around the sides of the part, so as to cut it to basic size. However, a plurality of tabs, connecting the several parts formed from the sheet, are left. These tabs hold the parts within the skeleton of the sheet while it is being punched.

After the sheet is removed from the machine, the parts are shaken out of the skeleton, that is, such that the individual parts are separated from the tabs. This tends to leave burrs along the edges of the parts where the opposite ends of the tabs previously were attached, and such burrs need to be removed with an operation known as de-burring. De-burring is time consuming and adds to the cost of producing the parts.

BRIEF SUMMARY OF THE INVENTION

The present invention is a process and apparatus for performing a shake-and-break operation, for dividing a sheet of stock material, or each sheet in a stack of nested sheets, into at least a first part and a second part, which eliminates, or at least substantially reduces, the need to eliminate burrs where the tabs, prior to separation, connected the two parts.

More particularly, in accordance with the present invention, elongated holes are punched, in a conventional manner, in the work piece to separate the first part from the second part except at at least one shake-and-break location. At the shake-and-break location, a frusto-conical shape punch and die punch a frusto-conical shape opening on either side of a center tab. The wider ends of the frusto-conical shape holes face the tab, and the narrower ends adjoin the elongated holes and have the same width as such holes, i.e., such that the elongated holes and frusto-conical holes are continuous. In such a manner, the ends of the tab which are connected to the first and second part lie in V-shaped recesses located to the outside of the edges of the elongated holes. When the pieces are subsequently separated in a shake and break process, any residual burrs are located in the V-shaped recesses, rather than along the edges of the part, and therefore do not, in most cases, need to be removed.

Preferably, the wider ends of the frusto-conical punch and matching die have a concave shape, such that the two edges of the tab, extending between opposite ends, have an outwardly convex shape. In this manner, the tab is thickest in the middle, and thinnest at the two connecting ends, to ensure that, during the shake-and-break operation, the tab will separate from the parts at its opposite ends rather than in the middle.

For a better understanding of the invention, reference is made to the following detailed description of a preferred embodiment, taken in conjunction with the drawings accompanying the application.

BRIEF DESCRIPTION OF THE DRAWINGS

FIG. 1 is a schematic drawing of a known turret press, which is one type of press which may be used in implementing the present invention;

FIGS. 2 and 3 are top and side views, respectively, of a punch according to the invention;

FIG. 4 is a top view of a die according to the invention for cooperation with the punch shown in FIGS. 2 and 3;

DETAILED DESCRIPTION OF PREFERRED EMBODIMENTS

Figure 6:
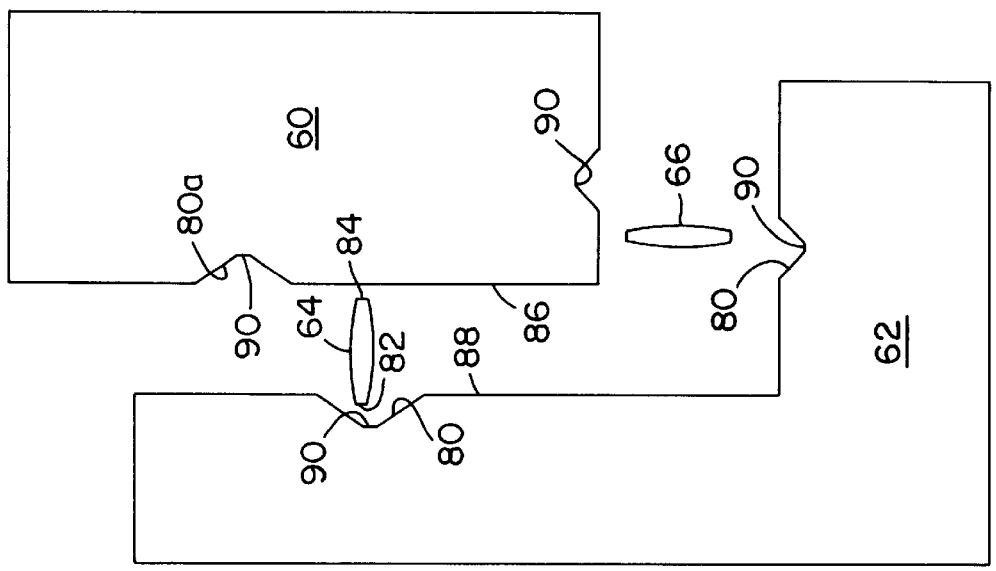
FIG. 6 is a top view of the sheet of FIG. 5, after a shake-and-break operation.

Referring to FIGS. 2 and 3, a punch 30 according to the invention has a generally known configuration which includes a shank 32, having a central axis 34, and a head 36. The shank is designed so that it can be mounted in an upper turret 10 of a conventional turret press such as press 10. The head 36 contains a punch face 38 which is generally perpendicular to the axis 34, whose shape determines the shape which will be cut from the stock material when the punch is used with a matching die.

As shown in FIG. 2, the punch face 38 includes two contiguous portions, a first portion 50 which is frusto-conical in shape, and a second portion 52 which is rectangular in shape. The first and second portions 50, 52 extend symmetrically along a centerline 54. The first portion 50 has a first end 56 (illustrated in broken lines), adjoining the second portion 52, and a second end 58. The broken lines 56 are present for definition purposes only, to show the boundary between the first and second portions 50, 52. In the exemplary embodiment, the two portions 50, 52 are unitary.

The first end 56 has a width "w", perpendicular to the centerline 54, which is the same as the width of the second portion 52 which it adjoins, and the second end 58 has a width which is substantially greater than the width "w". In other words, moving from the first end 56 toward the second end 58, the side edges of the first portion 50 flare outwardly. The edges of the second portion 52 extend parallel to the centerline 54. As shown in FIG. 2, the second end 58, rather than being straight, is preferably convex.

The corresponding die 40 is shown in FIG. 4 and includes a cylindrical body portion 42 and a die opening 44 corresponding to the shape of the punch face 38, i.e., with a first portion 46 having a frusto-conical shape, and an adjoining, second portion 48 having a generally rectangular face.

Figure 5:
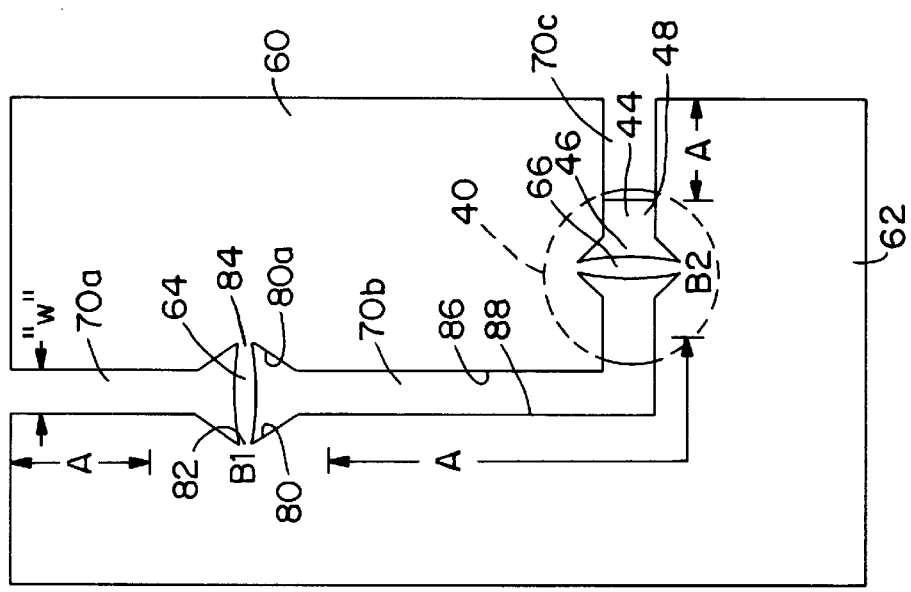
FIG. 5 is a top view of a sheet of metal stock material, illustrating a punch and die operation in accordance with the invention, prior to separating the parts.

FIG. 5 shows a sheet of stock material which has been punched into two parts 60 and 62, with a pair of tabs 64, 66 connecting the two parts. The process for forming the sheet shown in FIG. 5 will now be described. In order to form a pair of parts from a sheet of stock material, the punch 30 and die 40 are mounted in a turret press 10, along with a conventional punch and die of rectangular shape. For example, in FIG. 1, the punch 14 and die 16 can have a conventional rectangular shape, and punch 30 and die 40 can be mounted in the locations of punch 14*a* and die 16*a*, respectively.

In regions "A", rectangular shape holes 70*a,* 70*b,* and 70*c,* having a width "w", are punched in the sheet, using the conventional punch and die set 14, 16. Two "shake and break" locations B1 and B2 are left unpunched by the punch and die set 14, 16. Next, the turrets 10 and 12 are rotated to position the punch 30 and corresponding die 40 under the ram 20, and the work sheet is repositioned horizontally so as to move one of the shake-and-break locations, e.g., B2, between the punch 30 and die 40.

FIG. 5 shows the work sheet positioned on top of the die 40 for performing one of four punch operations with the punch 30 (the order does not matter). As shown, the sheet is positioned so that the rectangular portion 44 of the die 40 is aligned with the elongated hole 70*c,* and the first portion 46 of the die, i.e., the frusto-conical portion, faces away from the hole 70*c.* The punch 30 (not shown), which is positioned above the die 40, is then actuated by the ram 20, to cut the right hand side of the tab 66.

In order to cut the left hand side of the tab, a mirror image punch must be made on the opposite side of the tab. This may be done in one of two ways. One way is to provide two identical tab-cutting punches 30 in the turret, oriented at 180° relative to one another. With this approach, after the right hand side of the tab 66 is cut with one punch 30, the turret is rotated to move the second tab-cutting punch 30 into active position. The work piece is then shifted so that the second tab-cutting punch 30 (and its corresponding die 40) are located in a suitable position for punching out the opposite side of the tab 66. The second tab-cutting punch 30 is then actuated to cut the left hand side of the tab 66.

Alternatively, rather than providing two tab-cutting punches in the turret, some turret presses have an indexing mechanism, which allows the rotational angle of the punch and corresponding die to be changed. When employing the present invention with such a turret press, a single punch 30 and die 40 set are used to form the tabs. After punching the right side of the tab 66, the punch 30 and die 40 are rotated by 180 degrees within the turret. The work piece is moved so that the now rotated punch and die are located in a suitable position for punching the left side of the tab 66, and the punch 30 is again actuated.

The same procedure is then repeated in shake-and-break region B1 to form tab 64.

After the tabs 64, 66 are formed, the sheet is removed from the press 10 and is subject to a conventional shake-and-break operation. As shown in FIG. 6, the shake-and-break operation separates the tabs 64 and 66 from the two finished parts 60, 62.

As shown in FIGS. 5 and 6, due to their frusto-conical shape, the punch 30 and die 40 cut V-shaped recesses 80, 80*a* in the facing edges 86, 88 of the parts 60, 62. As a result, the opposite ends 82, 84 of the tabs 64, 66 are connected to the respective parts 60, 62 in the base of the V-shaped recesses 80, 80*a,* rather than along the edges 86, 88, as occurs in parts formed according to a conventional shake-and-break process.

The tabs 64, 66, break off from the parts 60, 62 at locations 90, where the ends 82, 84 of the tabs 64, 66 were formerly attached to the parts 60, 62. These locations 90 may contain burrs. However, such burrs are recessed from the edges 86, 88 of the parts 60, 62, and therefore normally do not need to be removed.

As shown, because the edges of the tabs 64, 66 extending between opposite ends 82, 84 have a convex shape, the tabs 64, 66 are thickest in the middle, and have a minimum width at their ends. Thus, it is ensured that the tabs will separate from the parts 60, 62 at their ends 82, 84 rather than breaking off in the middle.

The foregoing represents preferred embodiments of the invention. Variations and modifications will be apparent to persons skilled in the art, without departing from the inventive concepts disclosed herein. For example, while an embodiment has been described in which the punch and die face includes both a frusto-conical shape portion and a rectangular portion, it would be possible to use only the frusto-conical shape portion. In such case, the narrow end of the frusto-conical shape portion is aligned with the rectangular shape hole to form each half of the V-shaped recess. In such a case, the conventional, rectangular punch and die set would extend the rectangular hole on either side of the tab so as to be relatively close to the tab. The frusto-conical punch would cut only the V-shaped recess rather than any part of the rectangular hole. Also, while in the example the sides of the frusto-conical portion diverge linearly, sides which do not diverge in a linear fashion, but which form a similar recesses in the edges of the parts, are deemed to fall within the meaning of frusto-conical as used herein. In addition, while in the example rectangular shape punch and die sets are used to cut the regions separating the shake-and-break regions, any appropriate shape may be used, depending on the desired shape of the part. Thus, the part can be formed with curved edges or in other complex shapes. Also, the width of the cuts does not need to be constant provided that, immediately adjacent to the shake-and-break area, the width of the cuts corresponds to the width "w" of the narrower end of the frusto-conical portion of the punch. Finally, while an example has been described using a turret press, other types of apparatus for stamping or punching metal sheet stock may be employed. All such modifications and variations are intended to be within the skill of the art, as defined in the following claims.

I claim:

1. A shake-and-break process for forming at least a first part and a second part from a sheet of metal stock, comprising the steps of:

(a) punching elongated holes in said sheet to separate said first part from said second part, except at at least one shake-and-break location, such that said parts have opposed edges, wherein a pair of said elongated holes have terminal ends facing, from opposite directions, said shake-and-break location, and wherein said edges, at least adjacent said shake-and-break location, have a width "w" transverse to their axial direction;

(b) at said shake-and-break location, punching a pair of axially separated pieces from the sheet so as to leave a center tab there between, wherein each said piece has one end adjoining one of the terminal ends and having a width "w", and an opposite end facing said tab and having a width greater than "w", so that oppposite ends of said tab join said first and second parts in recesses; and (c) subsequently, shaking said first and second parts so that said tabs separate from said parts at said opposite ends within the recesses.

2. The process according to claim 1, wherein said tabs have opposed, outwardly convex edges between said opposite ends.

3. The process according to claim 1, wherein said pieces are frusto-conical in shape.

\* \* \* \* \*